(12) United States Patent
Nozawa

(10) Patent No.: US 8,917,809 B2
(45) Date of Patent: Dec. 23, 2014

(54) HONEYCOMB STRUCTURE HAVING HONEYCOMB CORE ARRANGED PARALLEL TO A PANEL SURFACE AND A MANUFACTURING PROCESS THEREFOR

(76) Inventor: Tsukasa Nozawa, Tokyo (JP)

( * ) Notice: Subject to any disclaimer, the term of this patent is extended or adjusted under 35 U.S.C. 154(b) by 0 days.

(21) Appl. No.: 13/407,196

(22) Filed: Feb. 28, 2012

(65) Prior Publication Data

US 2013/0224410 A1    Aug. 29, 2013

(51) Int. Cl.
*G21F 5/008*    (2006.01)

(52) U.S. Cl.
USPC .................. 376/272; 206/443; 250/507.1

(58) Field of Classification Search
CPC .. B65D 85/20; B65D 2577/042; G21F 5/005; G21F 5/008; G21F 5/012; G21C 19/07; G21C 19/40
USPC ......... 206/443, 446; 220/23.87, 23.88, 23.89; 250/506.1, 507.1; 376/272
See application file for complete search history.

(56) References Cited

U.S. PATENT DOCUMENTS

| | | | | |
|---|---|---|---|---|
| 3,537,416 | A * | 11/1970 | Cowles .................... | 114/74 A |
| 3,641,230 | A | 2/1972 | Jenks | |
| 4,063,999 | A * | 12/1977 | Wade ........................ | 376/272 |
| 4,476,988 | A * | 10/1984 | Tanner ....................... | 206/443 |
| 6,638,348 | B2 * | 10/2003 | Kuriiwa et al. | |
| 8,006,841 | B2 * | 8/2011 | Bontemps et al. ............ | 206/443 |
| 2004/0145079 | A1 | 7/2004 | Lin et al. | |

FOREIGN PATENT DOCUMENTS

| | | |
|---|---|---|
| JP | 2001287290 | 10/2001 |
| JP | 4862975 B2 | 1/2012 |
| WO | WO 01/57354 A2 | 8/2001 |
| WO | WO 2010/057089 A1 | 5/2010 |

OTHER PUBLICATIONS

Notification of Transmittal of the International Search Report and Written Opinion from the International Searching Authority, in corresponding International Application No. PCT/IB2013/000350, dated Jul. 26, 2013, pp. 1-12.

* cited by examiner

*Primary Examiner* — Bryon Gehman
(74) *Attorney, Agent, or Firm* — Juan Carlos A. Marquez; Bacon & Thomas PLLC

(57) ABSTRACT

The present invention is directed to a new manufacturing process for a FRP honeycomb structure where the honeycomb core assembly is arranged parallel to the surface. The honeycomb core is made from FRP prepreg with double structural walls and is manufactured by stiffening using heat and pressure. In a honeycomb core assembly set tank, a plurality of internal tanks are gathered in honeycomb core assembly. An internal tank FRP wall maintains the pressure of the internal tank, while an external FRP wall, heat foamed plastic resin and rigid FRP hull of set tank endure the external shock loading. A honeycomb core structure of six-corner cell can be infinitely arranged, and its structural position is unique. A set tank in which a plurality of internal tanks are gathered into a honeycomb core assembly can be arranged in infinite combinations, such that the total capacity can be extremely large.

10 Claims, 14 Drawing Sheets

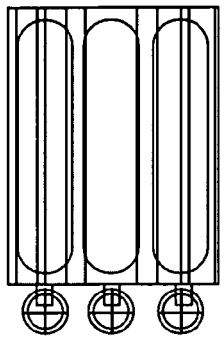
FIG. 20A
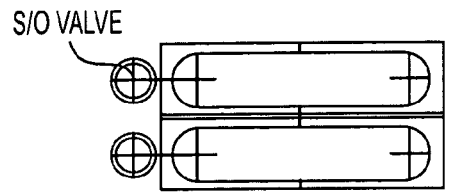
FIG. 20B
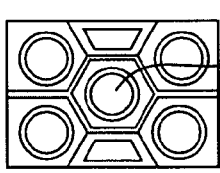
FIG. 20C
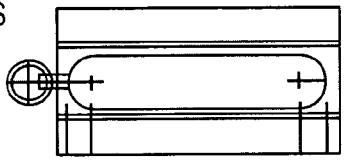
FIG. 20D
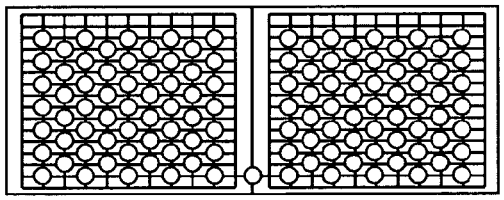
FIG. 21A
FIG. 21B
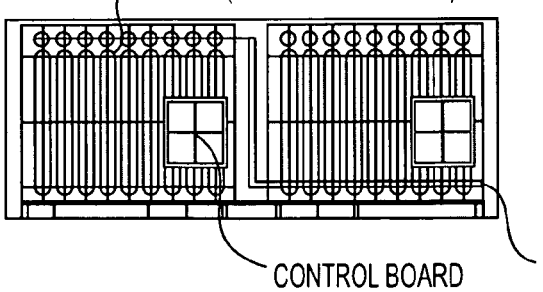
FIG. 21C
FIG. 21D

HONEYCOMB STRUCTURE HAVING HONEYCOMB CORE ARRANGED PARALLEL TO A PANEL SURFACE AND A MANUFACTURING PROCESS THEREFOR

BACKGROUND OF THE INVENTION

1. Field of the Invention

This invention is concerned with a fibre-reinforced plastic (FRP) honeycomb sandwich structure in which a honeycomb core is arranged parallel to panel surface in order to solve the peel-off problem between hull and core in the prior art and is concerned with a honeycomb core assembly set tank in which a lot of FRP internal tanks are gathered into honeycomb core assembly.

2. Description of the Prior Art

As a social background, global warming and dryness of fossil resource are given. One answer with possibility to these large questions is a fuel cell power generation system. Everybody knows even if the highest technology of the modern civilization is made good use of, the fossil fuel that is the inheritance of earth resource cannot be reproduced. When we enjoy the modern civilization in every day living, it is inevitable and irreversible to consume the fossil fuel.

The fuel cell generates electric energy from "Hydrogen ($H_2$)" and "Oxygen ($O_2$)", and the exhaust is "Water ($H_2O$)". In the power generation process, the fuel cell system does not exhaust the carbon dioxide assumed to be a cause of global warming. Present days, "Hydrogen ($H_2$)" used for the fuel cell is refined from LNG which is the fossil fuel.

However, predecessors of the modern civilization left us the reproducing scientific theories for "Hydrogen ($H_2$)" which is the fuel of the fuel cell. Even if the highest technology of the modern civilization is made good use of, the fossil fuel that is the earth resource cannot be reproduced. On the other hand, the power generation system of the fuel cell can be reproduced, even if it is now only the theory on the desk. Near future, the fuel cell has a possibility of being the energy system for our life to be an ideal energy system.

The fuel cell is an ideal energy system, indeed. However, it is necessary to overcome the two big difficulties for the practical use. One is a power generation cell of the fuel cell, and another one is a hydrogen tank. The power generation cell of the fuel cell has been improved by marketing now. However, the development of the hydrogen tank is still difficult.

Hydrogen is a gas at the normal temperature, and the liquefaction temperature in the atmospheric pressure is an extremely low temperature at degree of −200° C. or less. Moreover, the gas hydrogen of 4% is mixed with the oxygen in the air, and when the spark flies to neighborhood, it burns explosively. Handling is very difficult. Safety demands that the design and characteristics of the hydrogen tank be rated for world class performance. The hydrogen tank for the car has been researched in each car manufacturer, and the structural strength has achieved 750 atmospheric pressures now. However, there are some defects in the tank volume, shape and the spacing.

The difficult problem when we put the fuel cell to practical use in our life is transportation of hydrogen. As for hydrogen, if it is not liquefied, the transportation efficiency is too inferior to liquid gasoline because molecular weight is very small. However, the liquid hydrogen is not obtained if it does not cool to the extremely low temperature of −200° C. or less. It costs much to transport the liquid hydrogen with the vehicle only for special use.

Additionally, the difficult one is a hydrogen station. A similar hydrogen station to the gas station is necessary for the spread of the fuel cell powered vehicle. The internal pressure of the hydrogen tank in a state-of-the-art vehicle is 750 atmospheric pressures now. Therefore as for assumed hydrogen station, it is necessary to equip an underground tank with fully cooling system keeping the liquid hydrogen at minus 200° C. or less and also it is necessary to equip a pressurizing system which pressurizes the hydrogen gas to 750 atmospheric pressures. It is forecast that not only the installation cost but also maintenance cost becomes huge for the assumed hydrogen station.

Moreover, it is difficult to confine the liquid hydrogen in an underground tank of the normal temperature when the cooling function is lost by any chance. As a result, the situation in which most of the liquid hydrogen preserved at the hydrogen station should be discharged in air is thought, too. Because the gas hydrogen is an explosiveness gas, it is large issue for safety.

These are the problems and the current state that are demanded of the storing system for hydrogen gas. The fuel cell power generation system has the possibility of becoming the energy system that can be called ideal. However, the achievement of ideal energy system demands to us the research and development of cooperation and endurance.

The honeycomb structure has a good deal of benefits in lightweight and rigidity, thus the honeycomb sandwich panel has been widely adopted as a structure material in the architectural field and the aircraft field.

However, in a usual prior art the honeycomb core, a set of a lot of honeycomb cells, is manufactured from cardboard, mold plastic and lamina aluminum. Their structural strength are insufficient to support the vertical load on side surface, so, the honeycomb core cannot be arranged parallel to the surface in the honeycomb sandwich panel. In the prior art the direction of honeycomb core is arranged vertical to the panel surface, thus the hull is bonded on a small area of the six-corner edges of honeycomb core assembly. In a usual prior art, honeycomb sandwich panel cannot avoid the peel-off problem between the honeycomb core and hull. The peel-off problem is the fatal defect of the honeycomb sandwich panel.

The patent No. 4862975 in Japan, a manufacturing method of honeycomb core made from FRP prepreg is indicated. And it shows the manufacturing process in which the honeycomb core assembly is arranged parallel to the surface of honeycomb sandwich panel.

However, the manufacturing process of patent No. 4862975 is very complex and is inferior to productivity. And the shapes of six-corner honeycomb cells are easily distorted.

Problems that Invention is Solving

This invention is directed to the application of a honeycomb core structure in the storing and transportation of sensitive and/or volatile materials, such as hydrogen gas in a hydrogen fuel system. In order to use a honeycomb structure, the honeycomb core of a honeycomb sandwich panel from a vertical direction to a horizontal direction to solve the peel-off problem in the prior art. The peel-off problem is caused from the vertical arrangement of honeycomb core assembly. It is absolutely necessary to arrange the honeycomb core in parallel to the surface of the honeycomb sandwich panel to solve the problem.

However, when the honeycomb core is arranged parallel to the panel surface, the panel load becomes to hang on the side surface of honeycomb core assembly. As for the honeycomb core assembly in the prior art, strength is insufficient to support the load on the side surface of the honeycomb core assembly because it is manufactured from aluminum lamina, mold plastic and cardboards.

It is necessary to manufacture the strong honeycomb core that will not be collapsed by the side load. In this invention, honeycomb core assembly is made from soft FRP prepreg (pre-impregnated fibre-reinforced plastic) with double structural wall and is manufactured by the processes of stiffening by heat and pressure. The pressure is generated from the reaction force between the heat expansion pressure by internal pressurizing devices and external frame structure that restricts mechanically all the surface of honeycomb core assembly.

The new process of the invention also gives rise to a new usage where a honeycomb core assembly set tank may be manufactured that has many internal tanks in every honeycomb cell. This set tank is derived from the double wall honeycomb cells structure of this invention. The internal wall maintains the pressure of the internal tank, and the external wall of the double wall tank endures the external shock loading.

Patent No. 4862975 in Japan shows an epoch-making manufacturing method of the honeycomb core made from FRP prepreg. And it also shows the manufacturing processes of arranging the honeycomb core assembly in parallel to the surface of honeycomb sandwich panel. However, the manufacturing process is complex and is inferior to productivity and the shapes of six-corner honeycomb cells are easily distorted. The honeycomb core material and the manufacturing processes shown in Patent No. 4862975 are as follows.

FIG. 17 illustrates the manufacturing of the honeycomb core mother material shown in Patent No. 4862975. The stapler needles are continuously driven to sew between upper FRP prepreg and lower FRP prepreg, such that the stapler manufactures a continuous body of a long and slender bag.

FIG. 18 shows the honeycomb core mother in which many cylindrical heat foam plastic resins are inserted, sequentially. It is also possible to insert an air tube.

FIG. 19 shows the honeycomb structure in which the honeycomb core is horizontally arranged. The honeycomb core is manufactured by the method of Patent No. 4862975.

As shown in the above-discussed illustrations of manufacturing using the teachings of Patent No. 4862975, it is complex to manufacture many long and slender bags repeatedly. Moreover, it is not productive to insert an air tube and heat expansion resin into a long and slender space. The insertion work of the heat foam plastic resin is easier than that of the air tube. In this case, the heat expansion resin remains in the honeycomb core after heat foam is processed. Therefore, the weight of honeycomb structure becomes heavier compared with the method of pressurizing by the air tube. The present invention is intended to solve these defects.

SUMMARY OF THE INVENTION

For answering the problem and the current state demanded to the storing system of hydrogen gas, the processing technology and the concept of new hydrogen tank are described.

In terms of the honeycomb structure itself, the most important problem that should be solved is the peel-off problem in the prior art. To solve the problem, it is necessary to arrange the honeycomb core horizontally to the panel surface of honeycomb sandwich panel. It is necessary to manufacture a lot of honeycomb cells that will not be collapsed by the vertical load, because the honeycomb core is a set of many honeycomb cells in assembly. The honeycomb cell that can withstand not collapsing by a vertical load cannot be manufactured in the prior art. Patent No. 4862975 indicated the method to manufacture the honeycomb cells by FRP prepreg. However, its manufacturing process is complex and is inferior in productivity. Thus, it was necessary to invent a new process of manufacturing.

The invention is a manufacturing process for a FRP honeycomb structure in which a honeycomb core assembly is arranged parallel to the surface, for solving the peel-off problem of the honeycomb sandwich panel in the prior art. The peel-off problem is caused from the vertical arrangement of a honeycomb core assembly, because, when a honeycomb core assembly is vertically arranged, the hull of the honeycomb sandwich panel is bonded on a small area of the six-corner edges of honeycomb core assembly.

Therefore, it is necessary to arrange the honeycomb core assembly in parallel to the surface of the honeycomb sandwich panel, for solving the peel-off problem. However, the panel load becomes to hang on the side surface of honeycomb core assembly, when honeycomb core assembly is arranged parallel to the panel surface. As for the honeycomb core assembly in the prior art, strength is insufficient to support the load on the side surface of the honeycomb core assembly because it is manufactured from aluminum lamina, mold plastic and cardboards.

Therefore, it is necessary to manufacture the honeycomb core that will not be collapsed by the side load. In this invention, the honeycomb core assembly is made from soft FRP prepreg with a double structural wall and is manufactured by processes of stiffening by heat and pressure. And the pressure is generated from the reaction force between the heat expansion pressure by internal pressurizing devices and external frame structure that restricts mechanically all the surface of honeycomb core assembly. The soft FRP prepreg is a FRP prepreg material not stiffened yet.

The manufacturing process of the FRP honeycomb structure is composed of two manufacturing processes. The first is the process for manufacturing soft FRP honeycomb structure by the soft FRP prepreg and the second is the process for stiffening the soft FRP honeycomb structure to a rigid FRP honeycomb structure by heat and pressure.

The second invention is the manufacturing process for the honeycomb core assembly set tank in which a plurality of internal tanks are gathered in a honeycomb core assembly structure, for the purpose of manufacturing a tank with a double structural wall whose total capacity is considerably large. This set tank is derived from the manufacturing process for FRP honeycomb structures in which a honeycomb core assembly is arranged parallel to the surface. The internal wall maintains the pressure of the internal tank, and the outside wall of the every double wall tank endures the external shock loading.

Theoretically speaking, the honeycomb core structure of six-corner cell can be infinitely arranged, and its structural position is unique. In a similar fashion, theoretically a set tank in which a lot of internal tanks are gathered into a honeycomb core assembly can be arranged infinitely, thus its total capacity can be arbitrarily large.

Generally, there is a limitation in structural strength of the wall, wherein the diameter of the internal tank becomes large in low pressure and becomes small in high pressure, so the diameter of internal tank is varied in inverse proportion to the pressure of internal tank. The diameter of tank can be from 100 mm to 1000 mm roughly, in this invention.

Because the longitudinal load is multiplication of the area of base and the internal pressure, the longitudinal load is unrelated to the tank length. Therefore, if the diameter of the tank endures internal pressure, theoretically there is little limitation in the length of internal tank.

In this invention, the honeycomb core assembly set tank is made from soft FRP prepreg and is manufactured by processes of stiffening by heat and pressure. The pressure is generated from the reaction force between the heat expansion pressure by internal pressurizing devices and external frame structure that restricts mechanically all the surface of the honeycomb core assembly set tank. The soft FRP prepreg is a FRP prepreg material not stiffened yet.

The manufacturing process of the honeycomb core assembly set tank is composed of two manufacturing processes. The first is the process for manufacturing soft honeycomb core assembly set tank by soft FRP prepreg and the second is the process for stiffening process from the soft honeycomb core assembly set tank to rigid honeycomb core assembly set tank by heat and pressure.

In the prior art, an autoclave, a device that does heating and pressurizing at the same time, is used for the heating and stiffening procedure for FRP structure. The autoclave uniformly pressurizes the external surfaces of FRP structure by air pressure. The air pressure is provided from an outer supplier or is supplied by evaporation pressure inside the autoclave and it fills the whole internal space of the autoclave.

The autoclave is suitable for manufacturing a high-pressure tank of a comparatively large diameter single wall tank. However, there is a limitation in the structural strength; the diameter of a high-pressure tank so constructed cannot be infinitely enlarged. Further, it is difficult to manufacture a set tank using the autoclave. Specifically, when a plurality of tanks are gathered in an assembly structure, there is a middle-stuffing object between the internal FRP wall and the external FRP wall.

Therefore, there is a theoretical limitation in the capacity of the high-pressure tank manufactured by the autoclave. Also, a mass high-pressure tank is inferior in safety in the event of an accident. For example, the hydrogen tank of the vehicle powered by fuel battery of 70M Pascal manufactured by a Japanese automaker is a cocoon shaped tank with a single wall. The diameter is about 400 mm and the capacity is about 150 liters or less. The single tank lacks the extendibility.

It is difficult to manufacture a FRP tank having double structural walls using the autoclave. The reason is as follows:

As shown in FIG. 14, when a FRP tank is manufactured by an autoclave, the external surface of the tank is pressurized by air pressure in the autoclave. The internal surface of the tank is pressurized by the vapor pressure enclosed in the tank.

The external surface of the FRP tank is manufactured by long and slender zonal soft FRP prepreg. The wall of tank is strongly pressed by the pressure between the internal vapor pressure and the external air pressure. The full strength of tank wall cannot be obtained when either of these pressures is lacking. Thus, the tank wall by the autoclave is a single structural wall.

Referring to FIG. 15, when a FRP tank with a double structural wall is manufactured by the autoclave, the internal tank wall is pressurized only by the expansion pressure of internal tank and external wall is pressurized only by the air pressure in the autoclave. Between the internal FRP wall and the external FRP wall, there is a mid-stuffing object in which an internal pressure is not generated. The mid-stuffing object does not voluntarily generate any pressure. Therefore, the internal tank FRP wall cannot be pressed uniformly. Here also it is difficult to secure the strength of the tank wall.

This invention is basically different from the autoclave that uniformly pressurizes the external surface of FRP structure. This invention adopts a new method as shown for example in FIG. 16 with the following features:

(1) FRP honeycomb core is a set of the assembly of many honeycomb cells.
(2) The base material of the individual honeycomb cell is the heat foam resin.
(3) The honeycomb cell is manufactured by reinforcing the base material with soft FRP prepreg.
(4) The FRP honeycomb core assembly is assembled with a lot of the honeycomb cells.
(5) All surfaces of the honeycomb core assembly are restrained with an external frame.
(6) The external frame is put in the heating oven and the external frame and honeycomb core assembly are heated to stiffening temperature. There is no air pressure device outside the external frame.
(7) The heat foam resin expands by heating.
(8) The FRP prepreg is stiffened by the heat expansion pressure and the reaction force of external frame.

By this method, there is no middle part where internal pressure is not generated. Therefore, it becomes possible to manufacture the double wall structure of the internal wall and the external wall. The internal wall maintains the pressure of the internal tank. The external wall endures the external shock loading. The tank shape air pressure device assembly is manufactured from heatproof plastic material. It is expanded by internal pressure and temperature. The shape of the internal tank is transformed permanently.

Moreover, an external wall is an adhesive where it has strength. The structure of theoretical infinity can be manufactured by six-corner element's tying like the honeycomb core, if an individual element has a six-corner shape.

FIG. 16 uses the references as follows to illustrate the components of the invention: (BB) six-corner honeycomb cell assembly, (BC) five-corner honeycomb cell assembly, (DD) trapezoid filler assembly, (MCA) External frame assembly which restricts all the surface of honeycomb structure manufactured from soft FRP prepreg, (PIS) Internal FRP wall manufactured from soft FRP prepreg, (POS) External FRP wall manufactured from soft FRP prepreg, and (TAA) tank shape air pressure device assembly.

The FRP honeycomb structure can be used for the structural material of a vehicle in which lightweight and high strength are demanded, such as an aircraft, a rapid-transit railway car and an automobile. As for the glass fiber FRP, raw material exists unlimitedly and its manufacturing facility does not cost much.

FRP material also does not rust when exposed to seawater. Therefore, it is the best material for use in a large ship or for the wind power generation near the sea.

Generally speaking, there is a limitation in structural strength of tank wall, the diameter of internal tank becomes large in low pressure and becomes small in high pressure. It is natural that a high-pressure tank becomes a set tank composed of a plurality of small diameter tanks.

Also naturally, it becomes inevitable to improve the accumulation rate, for manufacturing the efficient high-pressure set tank. In this invention, there is no limitation on the number of internal tanks that will form a set tank having the honeycomb core assembly. Thus, the invention allows the manufacture of a high-pressure set tank whose total capacity is theoretically unrestricted.

Further, with a high-pressure tank, it is necessary to provide against external shock loading at the same time as maintaining internal pressure. In this invention, an internal FRP wall maintains the pressure of the internal tank, and an external FRP wall endures the external shock loading. As for the set tank of this invention, the role of all structural materials is clear, and the external shock loading is allotted to all the structural materials in the set tank.

In addition, a set tank of the small diameter tanks can divide the internal energy of an individual high-pressure tank. Therefore, the set tank of small diameter tanks is much safer than a single tank having a big diameter. It is useful for the high-pressure tank such as liquefied natural gases and the hydrogen gases.

The manufacturing process in this invention can manufacture a small diameter single tank having an internal volume of 500 cc. A hydrostatic test was conducted on a single tank pressurized at 20 MPa. The connection part of the tank was destroyed in the hydrostatic test, but main body wall of the single tank was not destroyed. Similarly, a small diameter single tank with an internal volume of 900 cc of the content was manufactured using as the material glass fiber FRP prepreg. The specifications for the test piece were 175 mm in length, compression areas 104 mm×104 mm. The weight was 0.89 Kg. The diameter of the weight-reducing hole was $\phi$77 mm. The maximum examination load of the uni-axial compression test was 295.5 kN. A straight-line part in the tank was cut for the strength test, and the compression examination was done. The test piece was not destroyed, though the test load reached the maximum value of the compression examination device.

When applied to the storage and/or transportation of sensitive or volatile materials, such as in a hydrogen fuel system, at the room temperature, a weight density which is almost equal to the liquid hydrogen cooled to minus 200° C. can be obtained by pressurizing the gas hydrogen to about 750 atmospheric pressures. Equipment and technology for a hydrogen tank rated to 750 atmospheric pressures already exists in the automotive industry. Generally speaking, there is a limitation in the structural strength of tank wall material; the diameter of internal tank becomes large in low pressure and becomes small in high pressure. Thus the diameter of high-pressure tank is varied in inverse proportion to the pressure of internal tank. Roughly, the diameter of high-pressure tank is from 100 mm to 1000 mm. The capacity of a single tank is limited by the strength of material that composes the tank wall.

For purposes of a hydrogen fuel system, a set tank may be used that is manufactured by combining a plurality of comparatively small diameter tanks. At a hydrogen station and on a lorry, a cooling system is not necessary if the transportation container has the ability to keep the hydrogen gas at 750 atmospheric pressures in the room temperature. Theoretically, the design load of tank wall doubles when the diameter of a high-pressure tank doubles when internal pressure is the same. Therefore, to manufacture a massive high-pressure tank the material of high strength, for instance, carbon fiber FRP is necessary. However, carbon fiber FRP is very expensive.

According to the present invention, a set tank is assembled with many internal tanks, wherein the diameter of the internal tank is smaller than that of a big diameter high-pressure tank developed in automaker. Each internal tank is composed of internal wall and external wall. The external shape of the assembled set tank is a rectangular hexahedron. Theoretically, the design load of the tank wall becomes half when the diameter of a high-pressure tank becomes half when internal pressure is the same. Thus, the material of high strength is not necessary to manufacture a small diameter tank. It is enough in glass fiber FRP. The price of glass fiber FRP is about 1/10 compared with carbon fiber FRP. The design load of the tank wall is smaller than that of a big diameter high-pressure tank. The weight of individual tank wall is light. However, a set tank is an assembly of many small tanks, so the total weight becomes the same or a little heavy compared with the big diameter tank.

A set tank according to the invention is composed of a plurality of internal tanks arranged as a honeycomb core assembly. Theoretically, the honeycomb core assembly of six-corners can be infinitely arranged. Therefore, theoretical total capacity of the set tank is infinity. Safety increases compared with the big diameter tank, because a set tank of many small tanks can divide the explosion energy to the sum of small energy when any trouble occurs.

The automatic rolling device of the hydrogen tank has been completed, too. An automatic rolling of the tank can be done in ten minutes. The hydrogen tank is a cocoon type tank made of carbon fiber FRP. It has the resisting pressure of 750 atmospheric pressures. The capacity is 40 liters per one tank. Even 150 liters have been completed now. The hydrogen tank is one of the key technologies in accomplishing a hydrogen fuel cell power generation system. The present invention is directed to solving at least some of the problems associated with developing and implementing such a system cost effectively.

(39) rigid FRP hull, (40) six-corner foamed plastic resin, (41) trapezoid-corner foamed plastic resin, and (42) rigid FRP honeycomb structure.

Figure 11:
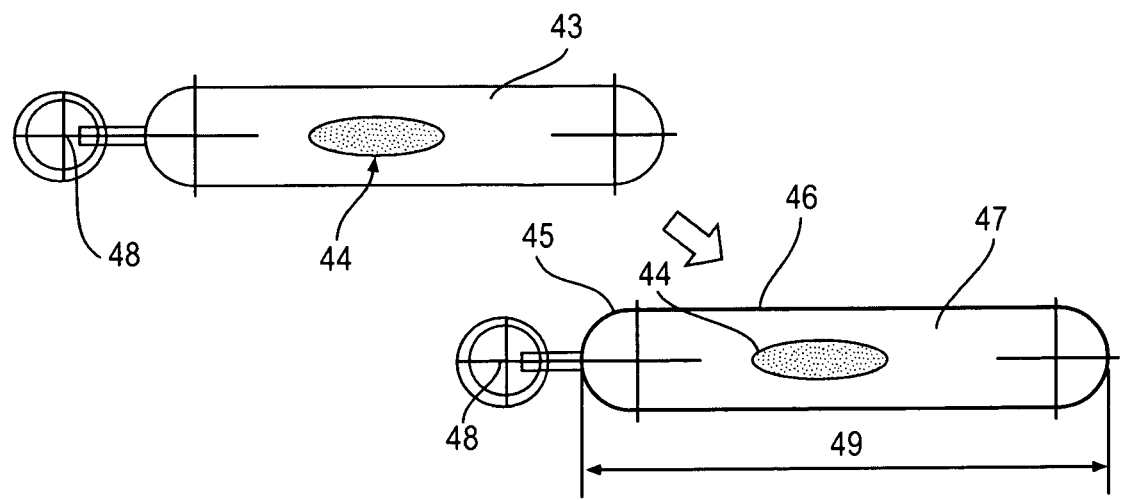
Figure 12:
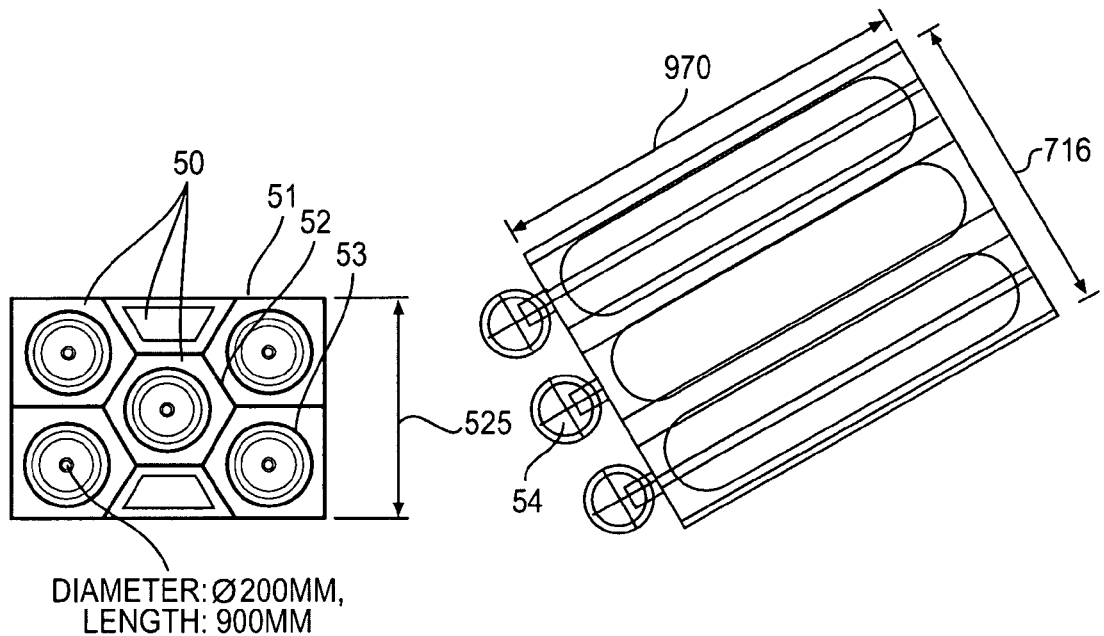

FIG. 11 illustrates a tank shape air pressure device & tank shape air pressure device assembly using the references (43) tank shape air pressure device, (44) heat evaporation compound, (45) tank shape space, (46) internal tank soft FRP wall, (47) tank shape air pressure device assembly, (48) shut off valve, and (49) tank length, FIG. 12 shows an example of a honeycomb core assembly set tank using the references (50) heat foamed plastic resin, (51) rigid FRP hull of set tank, (52) external FRP wall, (53) internal tank FRP wall, and (54) shut off valve.

Figure 13:
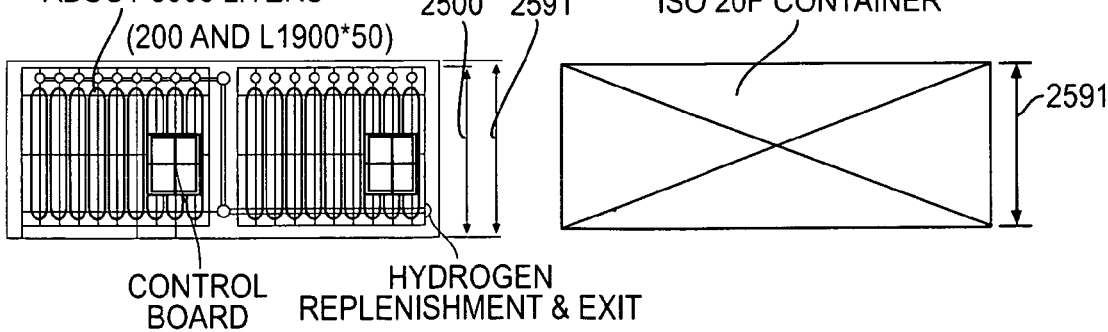

FIG. 13 shows a honeycomb core assembly set tank stored in ISO 20-Foot container.

Figure 14:
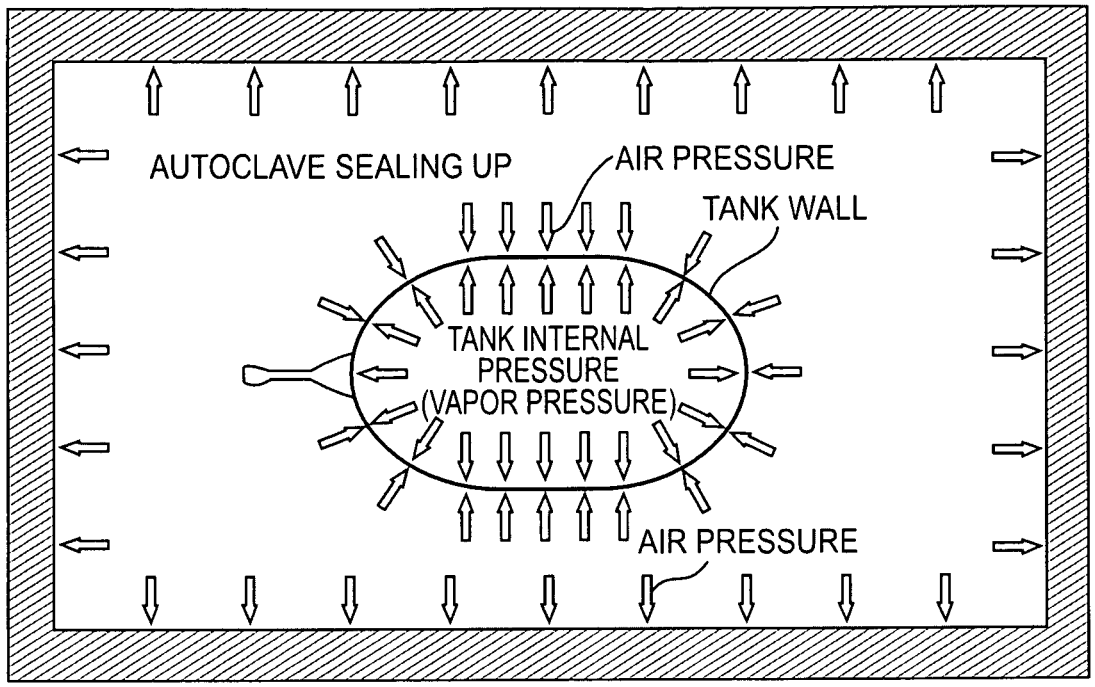

FIG. 14 illustrates the process when a FRP tank is manufactured by an autoclave.

Figure 15:
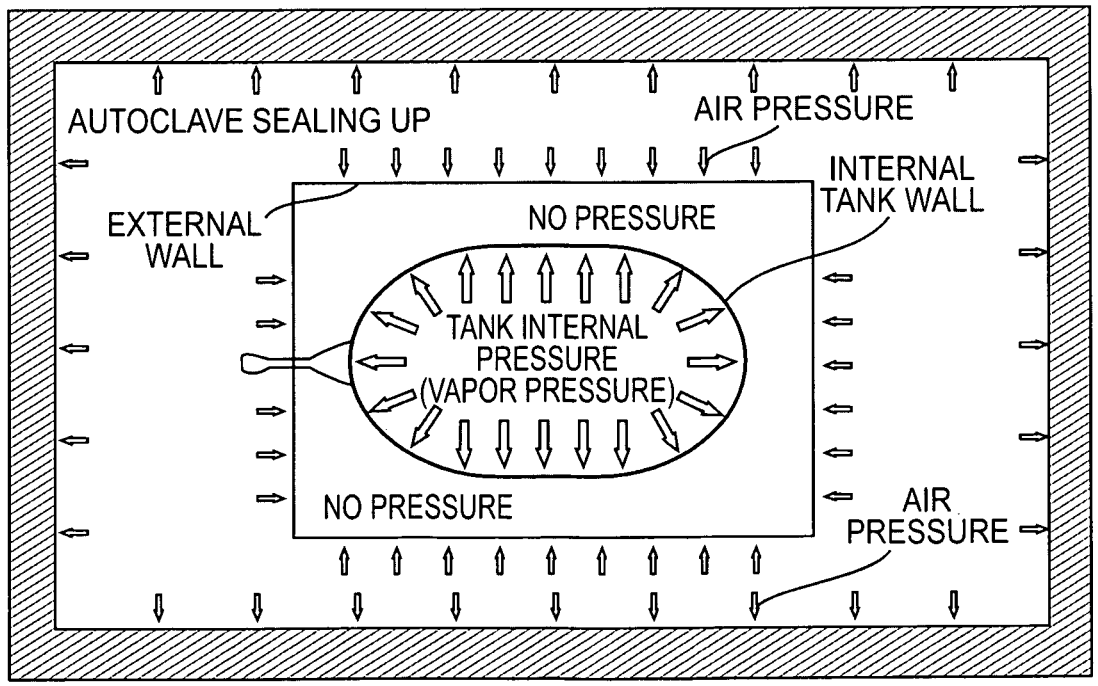

FIG. 15 illustrates the process when a FRP tank of a double wall tank is manufactured by the autoclave.

Figure 16:
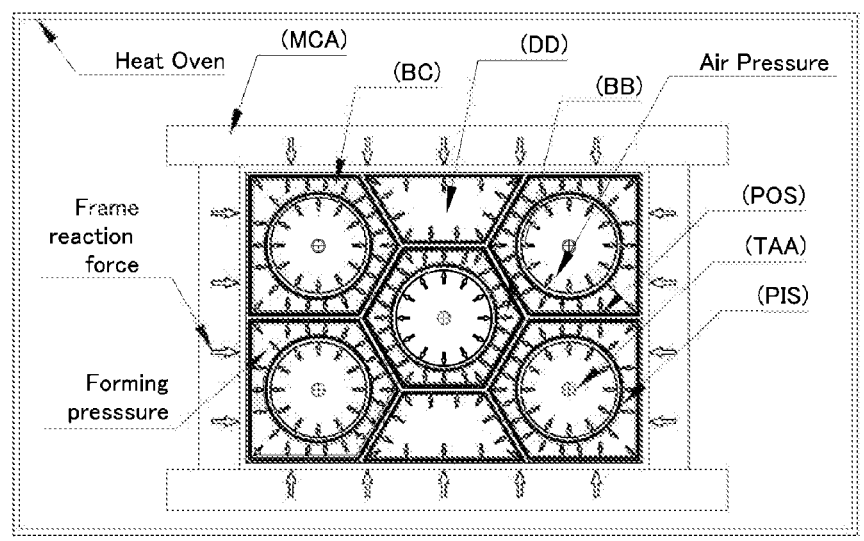

FIG. 16 illustrates the process used in the invention with the references (BB) six-corner honeycomb cell assembly, (BC) five-corner honeycomb cell assembly, (DD) trapezoid filler assembly, (MCA) External frame assembly which restricts all the surface of honeycomb structure manufactured from soft FRP prepreg, (PIS) Internal FRP wall manufactured from soft FRP prepreg, (POS) External FRP wall manufactured from soft FRP prepreg, and (TAA) tank shape air pressure device assembly.

Figure 17:
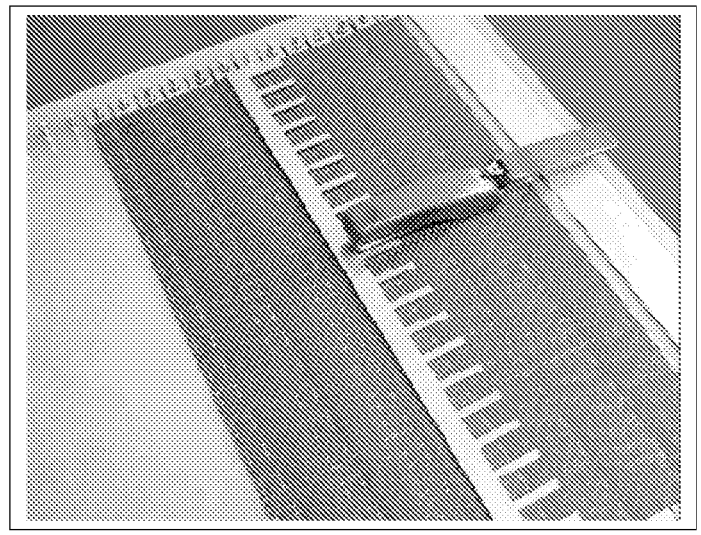

FIG. 17 illustrates the manufacturing of the honeycomb core mother material shown in Patent No. 4862975.

Figure 18:
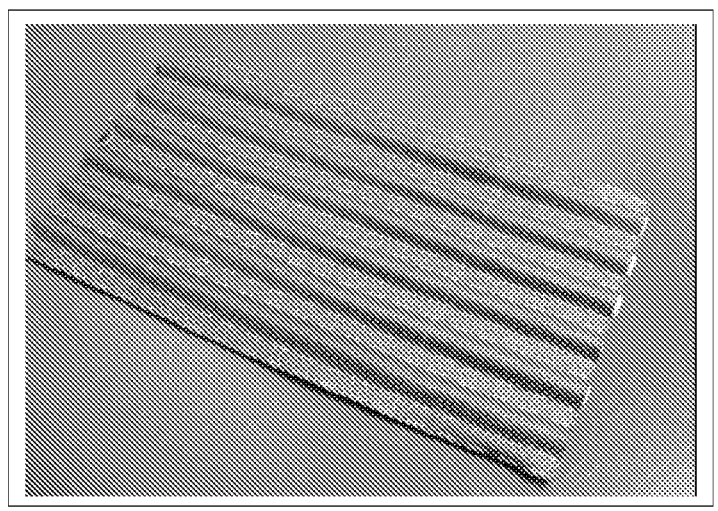

FIG. 18 shows the honeycomb core mother in which many cylindrical heat foam plastic resins are inserted sequentially according to Patent No. 4862975.

Figure 19:
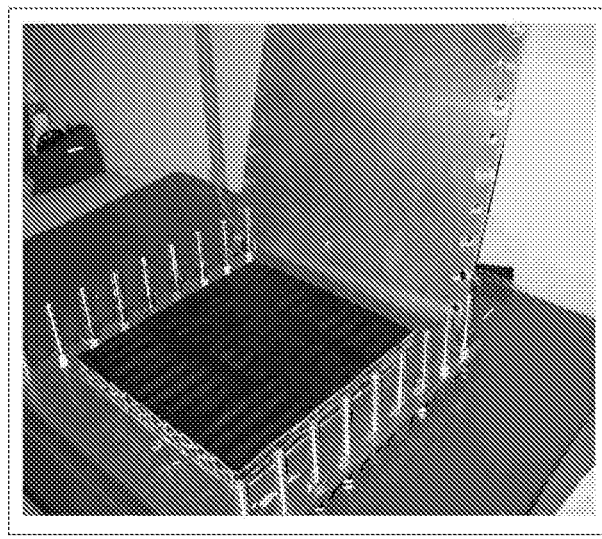

FIG. 19 shows the honeycomb structure in which the honeycomb core is horizontally arranged according to the method of Patent No. 4862975.

FIGS. 20A-20D show an embodiment of an on-board tank for the fuel cell powered vehicle.

FIGS. 21A-21D show a hydrogen tank unit for transportation.

Figure 22A:
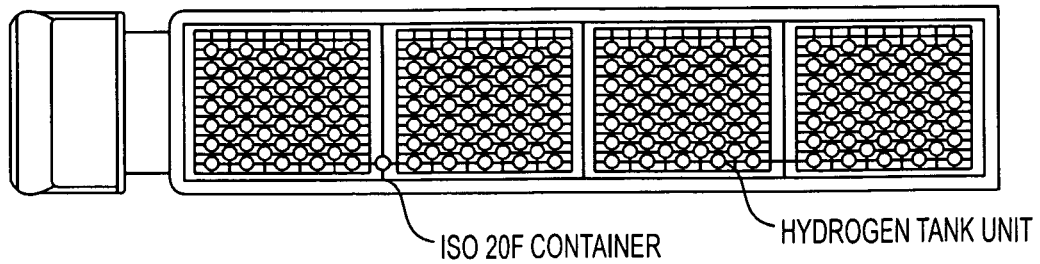
Figure 22B:
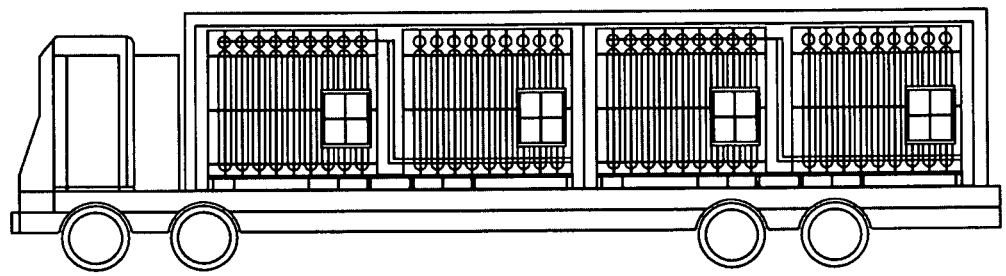

FIGS. 22A-22B illustrate a transportation lorry for hydrogen tank units.

Figure 23:
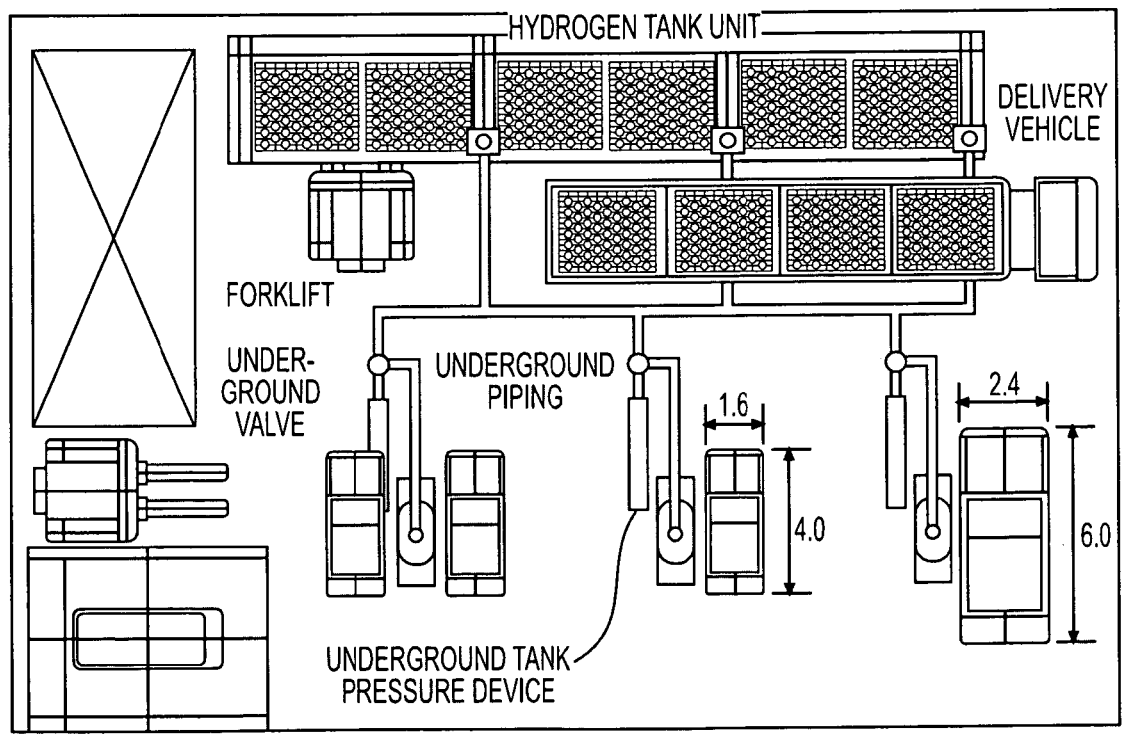
Figure 24:
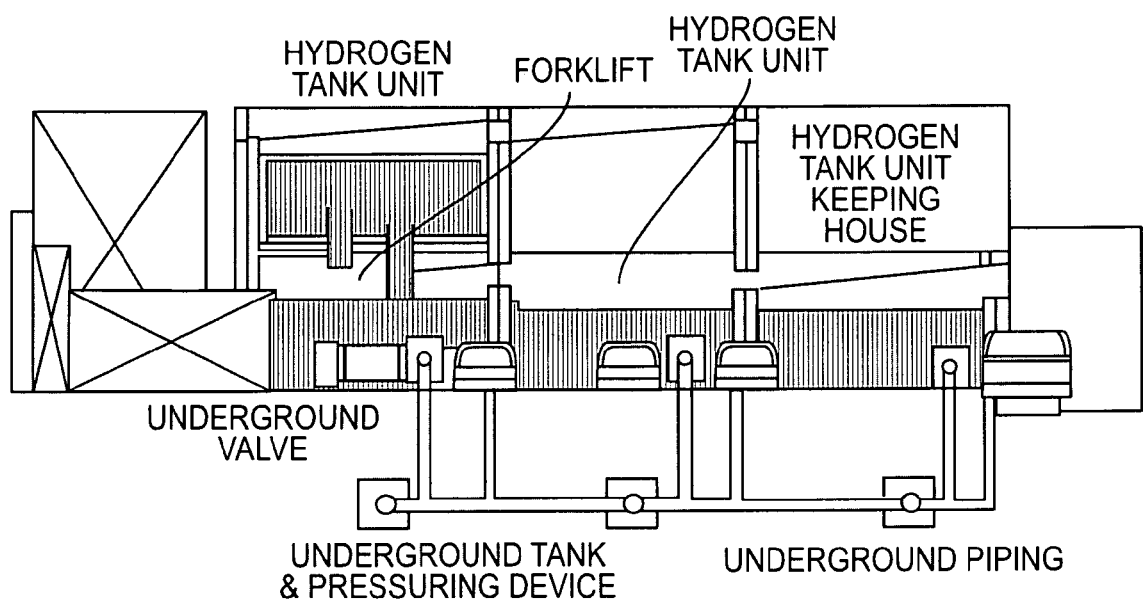

FIGS. 23-24 show an example of a hydrogen station.

DESCRIPTION OF THE PREFERRED EMBODIMENT

Referring to the drawing as follows, it explains the form of concrete execution of the manufacturing process of the FRP honeycomb structure in which a honeycomb core of double wall is arranged parallel to the surface of honeycomb sandwich panel, and explains the form of execution of a honeycomb core assembly set tank structure in which a plurality of internal tanks of double wall are gathered.

Figure 1:
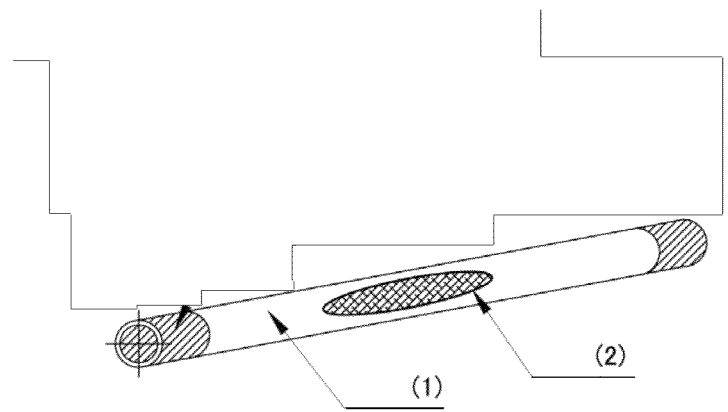
FIG. 1 shows a cylindrical air-type pressure device using the references of (1) cylindrical air-type pressure device, and (2) heat evaporation compound.

FIG. 1 shows a cylindrical air-type pressure device. The cylindrical air-type pressure device (1) is made from heatproof plastic tube and heatproof rubber tube; it has enough length and it encloses the heat evaporation compound (2). The heat evaporation compound (2) is the heat blowing agent and the evaporating liquids. The evaporating liquids are water and alcohol. Both ends of the cylindrical air-type pressure device (1) are sealed.

Because the air-type pressure device (1) can be made from the tube of heatproof plastic material and heatproof rubber, the length of the air pressure device (1) is arbitrary.

Figure 2:
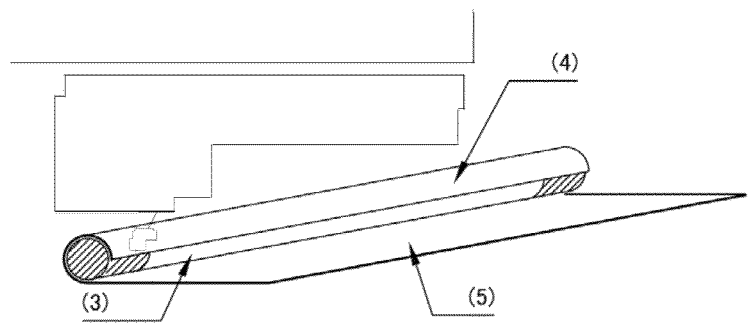
FIG. 2 shows an air-type pressure device assembly that uses the references (3) cylindrical air-type pressure device, (4) cylindrical air-type pressure device assembly, and (5) soft FRP prepreg.

FIG. 2 shows a cylindrical air-type pressure device assembly. The cylindrical air-type pressure device assembly (4) is manufactured by wrapping the external surface of cylindrical air-type-pressure device (3) with a soft FRP prepreg (5) two or more times. The soft FRP prepreg (5) becomes the internal FRP wall of honeycomb core of double wall.

At room temperature, the soft FRP prepreg (5) is the soft cloth, so it is not difficult to wrap the air-type pressure device (3) with the soft FRP prepreg (5). Because the adhesive of prepreg deteriorates at the room temperature, it is preferable to preserve the product within the freezer at minus 5° C. or less.

Figure 3:
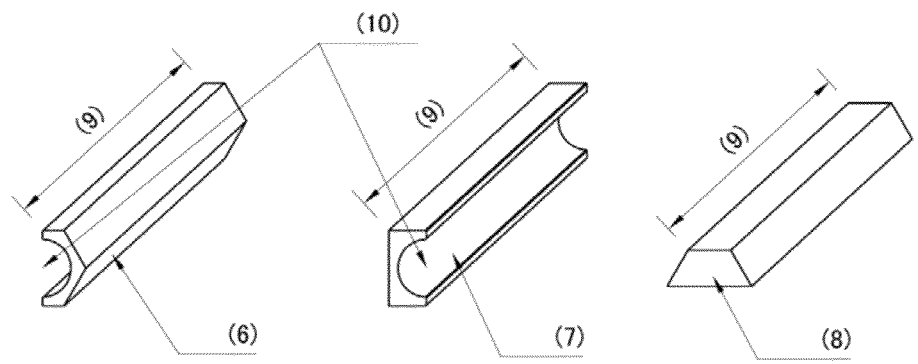
FIG. 3 shows a solid-type pressure device using the references (6) six-corner solid-type pressure device of half cut, (7) four-corner solid-type pressure device of half cut, (8) trapezoid-corner solid-type pressure device, (9) enough length, and (10) semicircle vacant space.

FIG. 3 shows a solid-type pressure device. The solid-type pressure device is made from the heat foam plastic resin by the metal mold of pushing out. It has enough length (9) and has semicircle vacant space (10) inside it. The solid-type pressure device has three types of mold heat foam plastic resin. The first is six-corner solid-type pressure device of half cut (6) and the second is four-corner solid-type pressure device of half cut (7) and the third is trapezoid-corner solid-type pressure device (8).

Because the solid-type pressure device can be made from heat foam plastic resin manufactured from metal mold of pushing out, the length of the solid-type pressure device is arbitrary.

Figure 4:
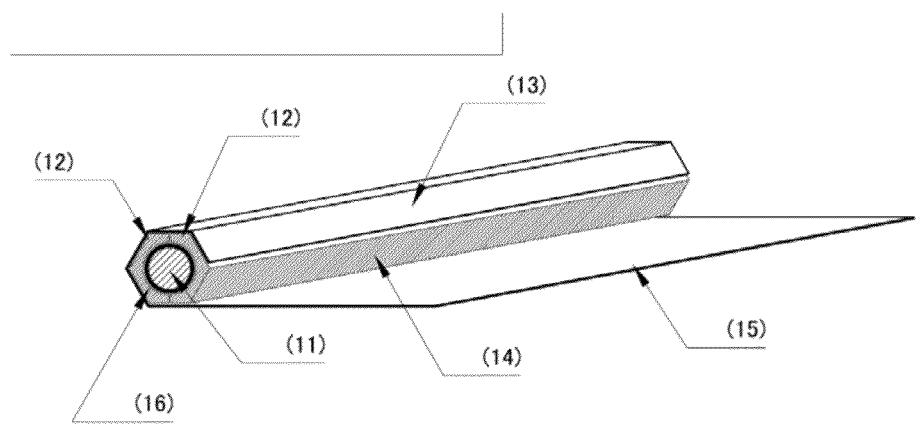
FIG. 4 shows a six-corner honeycomb cell assembly, wherein (11) air-type pressure device assembly, (12) six-corner solid-type pressure device of half cut, (13) six-corner honeycomb cell assembly, (14) six-corner solid-type pressure device, (15) soft FRP prepreg, (16) cylindrical vacant space.

FIG. 4 is a six-corner honeycomb cell assembly. When two parts of the six-corner solid-type pressure device of half cut (12) are combined, they are shaped to be six-corner solid-type pressure device (14) with cylindrical vacant space (16) inside it. The six-corner solid-type pressure device (14) is long and slender object manufactured with arbitrary length. The air-type pressure device assembly (11) is stored in the cylindrical vacant space (16) of the six-corner solid-type pressure device (14). The six-corner honeycomb cell assembly (13) is manufactured by wrapping the six-corner solid-type pressure device (14) two or more times by the soft FRP prepreg (15). In this case, this soft FRP prepreg (15) becomes the external FRP wall of honeycomb cell of double wall. This six-corner honeycomb cell assembly (13) is used at the central position of honeycomb core assembly.

At room temperature, the soft FRP prepreg (15) is the soft cloth, so it is not difficult to wrap six-corner solid-type pressure device (14) with the soft FRP prepreg (15). Because the adhesive of prepreg deteriorates at the room temperature, it is preferable to preserve the product within the freezer at minus 5° C. or less.

Figure 5:
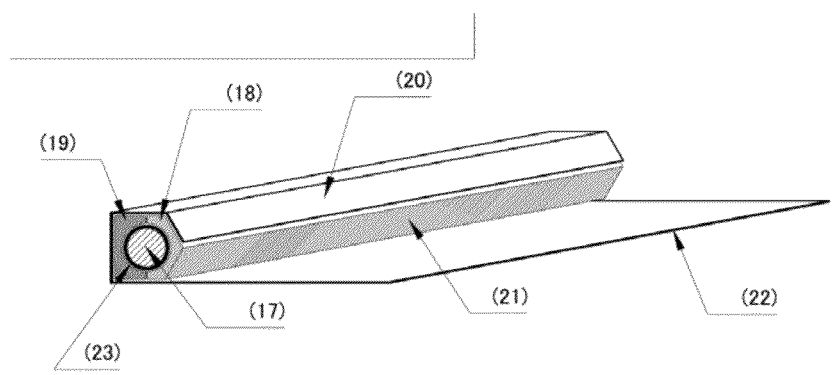
FIG. 5 shows a five-corner honeycomb cell assembly using the references (17) air-type pressure device assembly, (18) six-corner solid-type pressure device of half cut, (19) four-corner solid-type pressure device of half cut, (20) five-corner honeycomb cell assembly, (21) five-corner solid-type pressure device, (22) soft FRP prepreg, and (23) cylindrical vacant space.

FIG. 5 is a five-corner honeycomb cell assembly. When the six-corner solid-type pressure device of half cut (18) and the four-corner solid-type pressure device of half cut (19) are combined, they are shaped to be five-corner solid-type pressure device (21) with cylindrical vacant space (23) inside it. The five-corner solid-type pressure device (21) is a long and slender object with an arbitrary length. The air-type pressure device assembly (17) is stored in the cylindrical vacant space (23) of the five-corner solid-type pressure device (21). The five-corner honeycomb cell assembly (20) is manufactured by wrapping the five-corner solid-type pressure device (21) two or more times by the soft FRP prepreg (22). In this case, this soft FRP prepreg (22) becomes the external FRP wall of honeycomb cell of double wall. This five-corner honeycomb cell assembly (20) is used at the left and right side surface of honeycomb core assembly.

At room temperature, the soft FRP prepreg (22) is the soft cloth, so it is not difficult to wrap five-corner solid-type pressure device (21) with the soft FRP prepreg (22). Again, because the adhesive of prepreg deteriorates at the room temperature, it is preferable to preserve the product within the freezer at minus 5° C. or less.

Figure 6:
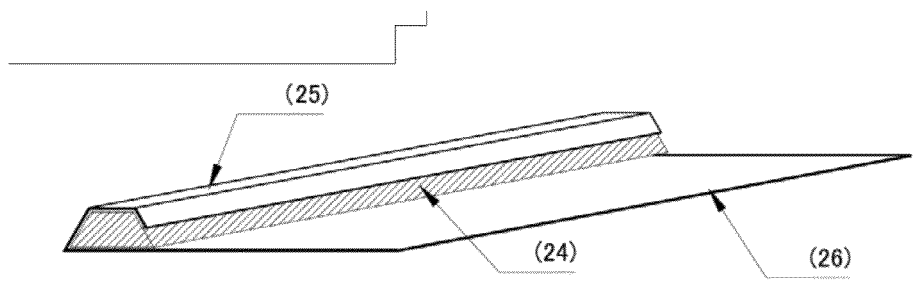
FIG. 6 shows a trapezoid filler assembly with the references (24) trapezoid-corner solid-type pressure device, (25) trapezoid filler assembly, and (26) soft FRP prepreg.

FIG. 6 is a trapezoid filler assembly. The trapezoid filler assembly (25) is manufactured by wrapping the trapezoid-corner solid-type pressure device (24) with the soft FRP prepreg (26) two or more times. The trapezoid filler assembly (25) is a long and slender object and its length is the same as the honeycomb cell assembly. At room temperature, the soft FRP prepreg (26) is the soft cloth, so it is not difficult to wrap the trapezoid-corner solid-type pressure device (24) with the soft TRP prepreg (26).

Generally, a honeycomb core is a set of many honeycomb cells of six-corner type and the external boundary of honeycomb core is trapezoid ruggedness surface. The trapezoid filler assembly (25) is used for correcting the ruggedness of top and bottom surfaces. In this case, this soft FRP prepreg (26) becomes the reinforcement structure of honeycomb structure and hull. Again, because the adhesive of prepreg deteriorates at the room temperature, it is preferable to preserve the product within the freezer at minus 5° C. or less.

Figure 7A:
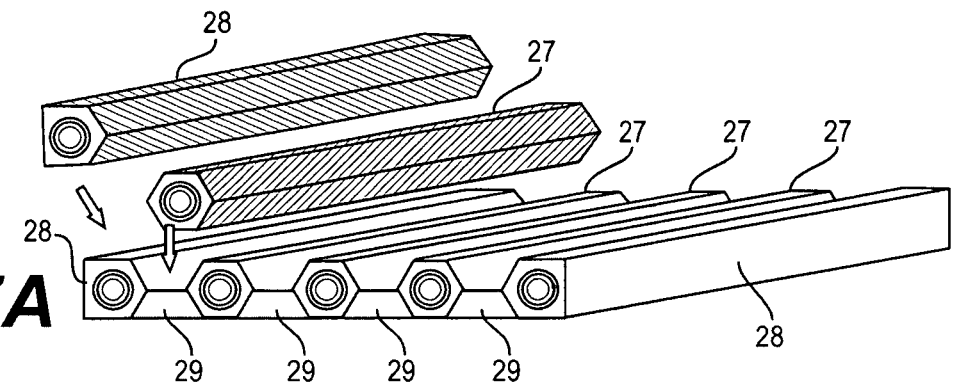
FIGS. 7A-7C show an assembly procedure explanation chart of FRP honeycomb core with the references (27) six-corner honeycomb cell assembly, (28) five-corner honeycomb cell assembly, (29) trapezoid filler assembly, and (30) soft honeycomb core assembly.
Figure 7B:
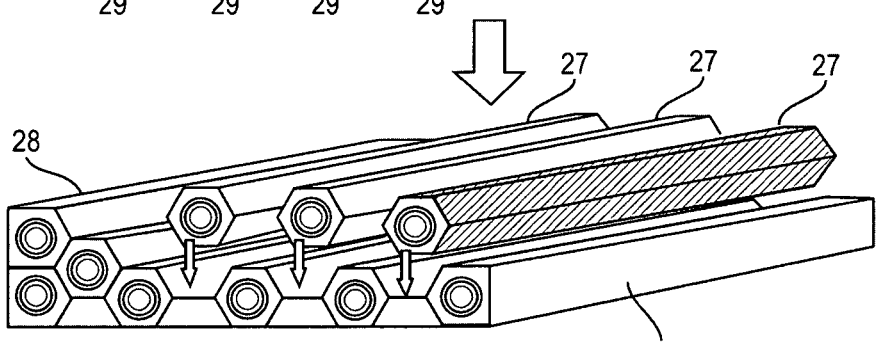
Figure 7C:
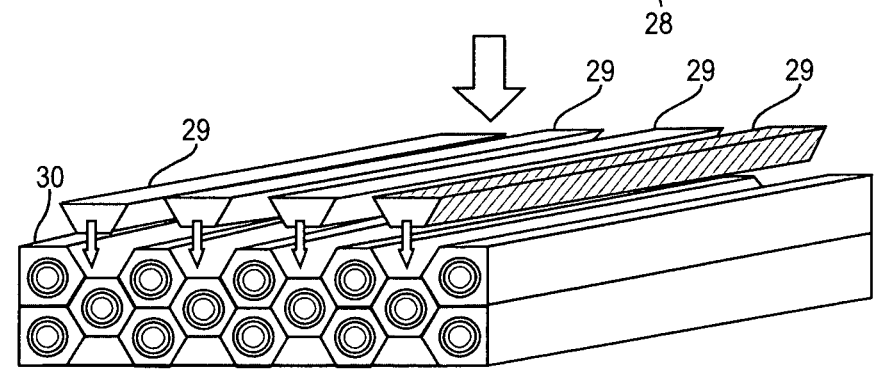

FIGS. 7A-7C show an assembly procedure explanation chart of FRP honeycomb core that illustrates the procedure sequence as follows:

A. The process preparation is as follows:
   (a) The five-corner honeycomb cell assembly (28) and the trapezoid filler assembly (29) and the six-corner honeycomb cell assembly (27) preserved in the freezer at minus 5° C. or less are taken out from the freezer.
   (b) The adhesive function of FRP prepreg is lost at that temperature therefore it is not difficult to assemble them.
B. The first step is as follows:
   (a) The five-corner honeycomb cell assembly (28) is placed on the left corner end.
   (b) The trapezoid filler assembly (29) is placed to next right.
   (c) The six-corner honeycomb cell assembly (27) is placed on the next position to the right.
   (d) As for clause (b) and clause (c), a necessary frequency is repeated according to the requested width of soft honeycomb core assembly.
   (e) At the end of the first step, the five-corner honeycomb cell assembly (28) is placed on the right corner end.
C. The second step is as follows:
   (a) The five-corner honeycomb cell assembly (28) is placed on the left corner end of second step.
   (b) The six-corner honeycomb cell assembly (27) is placed on the next position to the right.
   (c) As for clause (b), a necessary frequency is repeated according to the requested width of soft honeycomb core assembly.
   (d) At the end of the second step, the five-corner honeycomb cell assembly (28) is placed on the right corner end.
D. The third step is as follows:
   (a) Same work as the second step is repeated again till ahead one step to the last, according to the requested thickness of soft honeycomb core assembly (30).
E. The last step is as follows:
   (a) The ruggedness surface of honeycomb core boundary is buried sequentially by using the trapezoid filler assembly (29).
   (b) After the boundary surface of soft honeycomb core assembly (30) is corrected from trapezoid ruggedness surface to the smooth surface, the soft honeycomb core assembly (30) is completed.

Theoretically, the honeycomb structure of six-corner type can be infinitely arranged, and the structural position is unique. Therefore the honeycomb structure of an arbitrary size can be manufactured by repeating the similar procedure.

Actually, it is not possible to arrange it infinitely because there is a size error margin in an individual solid pressure device assembly. When the epoxy system FRP prepreg is heated to the stiffening temperature, the air-type pressure device assembly and the solid-type pressure device assembly are expanded with heating. Therefore, it is desirable to design the size of the solid pressure device assembly smaller than the ideal shape.

Figure 8:
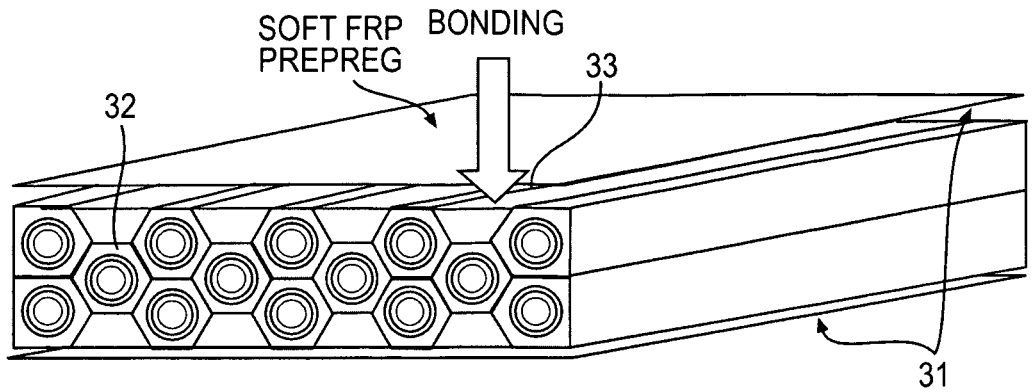
FIG. 8 shows an assembly procedure explanation chart of FRP honeycomb structure using the references (31) soft FRP hull, (32) soft FRP honeycomb core assembly, and (33) soft FRP honeycomb structure

FIG. 8 is an assembly procedure explanation chart of FRP honeycomb structure. The soft FRP honeycomb structure (33) is manufactured from the soft FRP honeycomb core assembly (32) by bonding the soft FRP hull (31) on the top and bottom surface of the soft FRP honeycomb core assembly (32). The soft FRP hull (31) is made from two or more sheets of the soft FRP prepreg.

The trapezoid filler assembly already corrects the top and bottom surfaces of the soft FRP honeycomb core assembly to the smooth surfaces, so the soft FRP hull is bonded on the wide and smooth surface of honeycomb core assembly. Therefore, the peel-off problem of honeycomb sandwich panel in the prior art is solved in this invention.

Figure 9:
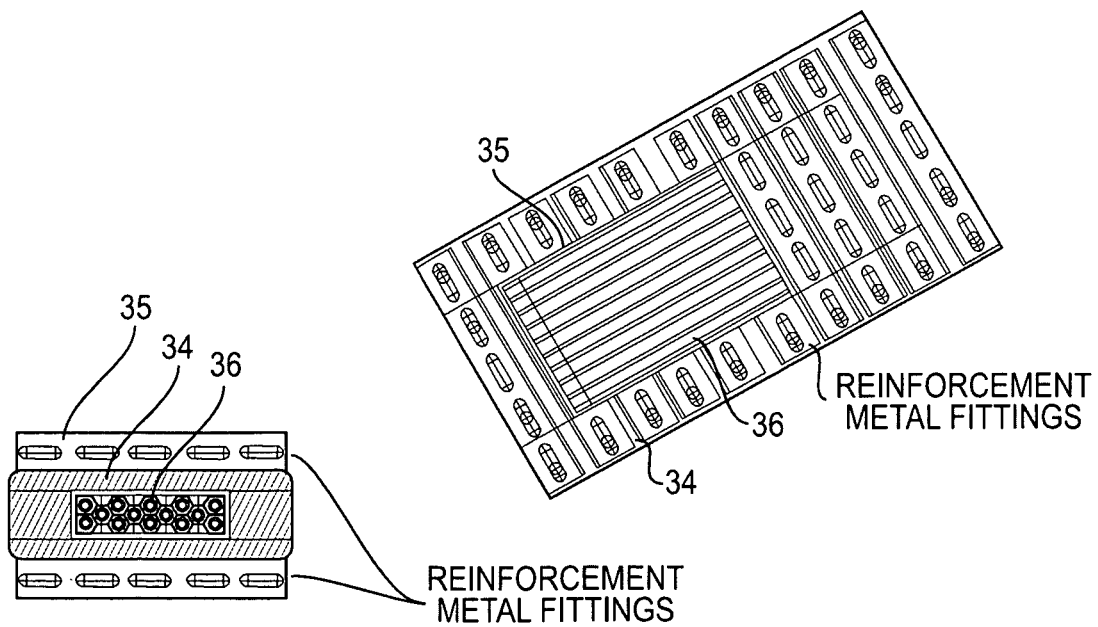
FIG. 9 illustrates an external frame assembly and soft FRP honeycomb structure with the references (34) external frame, (35) external frame assembly, and (36) soft FRP honeycomb structure.

FIG. 9 is an external frame assembly and soft FRP honeycomb structure. The process for stiffening process from the soft FRP honeycomb structure to rigid FRP honeycomb structure by heat and pressure is as follows:

A. The external frame assembly (35) is manufactured by storing the soft FRP honeycomb structure (36) in the external frame (34). The external frame (34) is made from the frame structure parts and restrains all the surface of the soft FRP structure (36).
B. The external frame assembly (35) is put in the heating oven. The external frame assembly (35) is heated during the fixed time in the heating oven at an appropriate temperature within the range of 100° C.-200° C. In general, the stiffening temperature of the epoxy adhesive is about 130° C.
C. All the pressure device assemblies, the cylindrical air-type pressure device assembly (4) and the five-corner honeycomb cell assembly (20) and the six-corner honeycomb cell assembly (13) and the trapezoid filler assembly (25) are expanded by heating.

By the way, all the soft FRP prepreg wrapping around solid-type pressure device is arranged to be honeycomb core assembly by the first process for manufacturing soft FRP honeycomb structure from soft FRP prepreg. The soft FRP prepreg is manufactured from adhesive resin and reinforced fiber. The adhesive resin in the soft FRP prepreg is melted by heating and is transformed plastically by internal pressure.

Therefore, every soft FRP prepreg wrapping around all the honeycomb cells is bonded together permanently and is stiffened by heat and pressure. As the result, all the soft FRP prepreg materials become the honeycomb core assembly.

A. The FRP honeycomb structure is manufactured by stiffening from the soft FRP honeycomb structure (36) to rigid FRP honeycomb structure (42) by heating at the same time as pressurizing by the reaction force between expansion pressure of the pressure device and the external frame (34).
B. After enough cooling time, the rigid FRP honeycomb structure (42) is taken out of the external frame (34) to be the FRP honeycomb structure.

Figure 10:
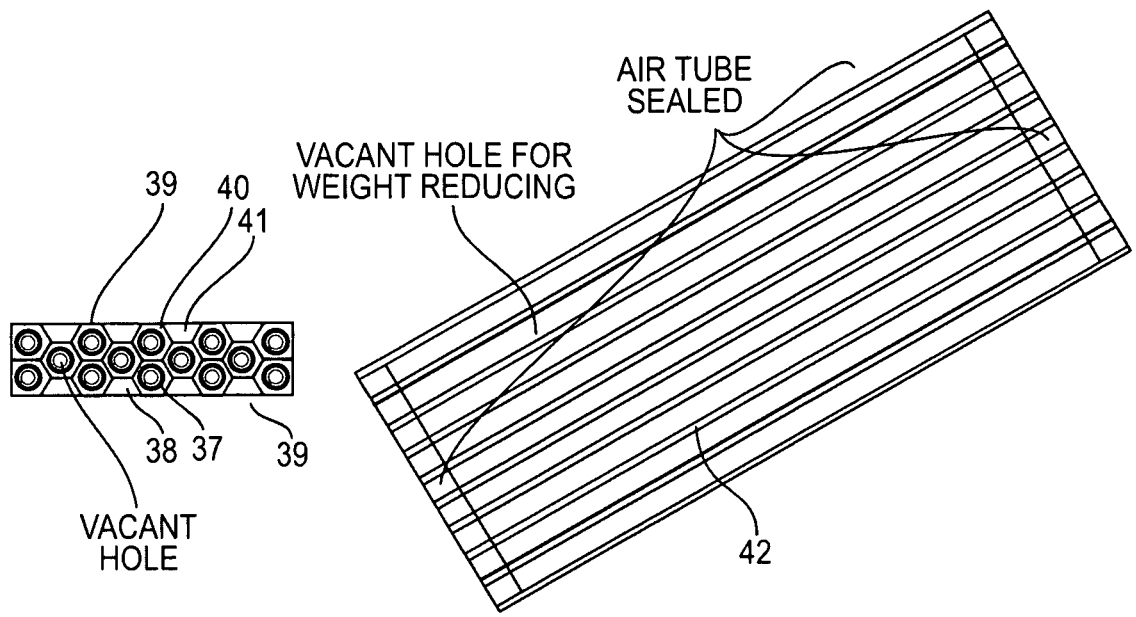
FIG. 10 illustrates a Rigid FRP honeycomb structure with the references (37) internal FRP wall, (38) external FRP wall.

FIG. 10 shows a rigid FRP honeycomb structure. The rigid FRP honeycomb structure (42) is composed of internal FRP wall (37), external FRP wall (38), six-corner foamed plastic resin (40), trapezoid-corner foamed plastic resin (41) and rigid FRP hull (39).

Therefore, the rigid FRP honeycomb structure is characterized by double structural wall. A core assembly of the rigid FRP honeycomb structure is arranged parallel to the surface of honeycomb sandwich panel. The rigid FRP hull is bonded on the smooth and wide surface of honeycomb core assembly; therefore, the FRP honeycomb structure in this invention solves the peel-off problem. In the air tube, heat evaporation compounds such as alcohol and water remain in the honeycomb structure. It is desirable to abandon the heat evaporation compound by cutting the sealed ends.

The process of manufacture of the honeycomb core assembly set tank characterized with double wall is almost the same as the process of manufacture of the FRP honeycomb structure in which honeycomb core assembly is arranged parallel to the surface. The process of manufacturing the honeycomb core assembly set tank is described herein below.

FIG. 11 is the tank shape air pressure device (43) & tank shape air pressure device assembly (47). The tank shape air pressure device (43) is made from heatproof plastic material, it has arbitrary tank length (49) and it encloses the heat evaporation compound (44). The heat evaporation compound (44) is the heat blowing agent and the evaporating liquids. The evaporating liquids are water and alcohol. As for the internal atmospheric pressure, high pressure as possible is desirable if structural strength is permitted. The internal tank soft FRP wall (46) is for the reinforcement of the internal tank.

The tank shape air pressure device assembly (47) is manufactured by the reinforcement procedure of the tank shape air pressure device (43) with soft FRP prepreg. The reinforcement procedure is as follows:
1. The soft FRP prepreg is cut into long and slender zonal.
2. Long and slender zonal prepreg is wrapping around the tank shape air pressure device (43).

The size of the honeycomb core varies in proportion to the size of an internal tank. However, the manufacturing process after this is the same as the process of manufacture of the FRP honeycomb structure. The different point is that the vacant space shape, which is the internal shape of solid-type pressure device assembly, is changed from the cylindrical space to the tank shape space.

The process of manufacture of the honeycomb core assembly set tank characterized with double wall is almost the same as the process of manufacture of the FRP honeycomb structure. The differences are the following 3 points:
1. cylindrical vacant space (16), (23)→tank shape space (45)
2. cylindrical air-type pressure device (3)→tank shape air pressure device (43)
3. air-type pressure device assembly (4)→tank shape air pressure device assembly (47)

FIG. 12 is an example of honeycomb core assembly set tank. The heat foamed plastic resin (50) is made from solid-type pressure device by heating. The internal tank FRP wall (53) is made from the internal tank soft FRP wall. The external FRP wall (52) is made from the soft FRP prepreg wrapping around the solid-type pressure device. The rigid FRP hull of honeycomb core assembly set tank (51) is made from the soft FRP hull.

The internal wall maintains the pressure of the internal tank. The external wall of the tank characterized by double wall endures the external shock loading. And the tank shape air pressure device assembly is manufactured from heatproof plastic material. The heatproof plastic tank is expanded by internal pressure and temperature. The shape of the internal tank is transformed permanently.

When the set tank is taken out of the external frame, the expanding heat evaporation compound such as alcohol and water is remaining in the internal tanks of the set tank. It is desirable to abandon this heat evaporation compound by opening the shut off valve (54) of each internal tank. The specifications of the example of the honeycomb core assembly set tank are as follows:
1. The total capacity of set tank: 90 liters
2. Internal tank: (1) Diameter: ($\phi$200 mm, (2) Length: 900 mm, (3) The number of internal tanks: 5
3. The size of set tank: (1) Length: 970 mm, (2) Width: 716 mm, (3) Height: 525 mm FIG. 13 is a honeycomb core assembly set tank stored in ISO 20-Foot container. Theoretically it becomes possible to manufacture a tank with infinite capacity. Because the honeycomb core structure composed by six-corner tanks has an infinite size. The capacity efficiency of the set tank is improved by increasing the number of accumulation of tanks of six-corner. Theoretically, there is no restriction in the length of the individual tank. The outline and the size of the honeycomb core assembly set tank stored in ISO 20-foot container are shown in FIG. 13. The specifications of the set tank are as follows:
(1) ISO 20-foot container contains 2 units,
(2) The capacity of one unit: 3000 liters and the number of internal tanks: 50,
(3) The internal tank diameter: $\phi$200 mm and the internal tank length: 1900 mm,
(4) The total capacity ISO 20-foot container: 6000 liters,
(5) The total number of internal tanks: 100 (50*2)

Additional Embodiment

When an internal tank is stiffened by reinforced fiber FRP, a newly developed high-pressure tank is manufactured by the heating and pressurizing device, which uses a mechanical reaction force of internal pressure devices with heat foam resin and external frame.

Among the features of this system, the internal pressure device method uses the heating oven at ground atmospheric pressure. The heating oven is greatly cheap compared with autoclave because the strength is not needed for the partition wall of heating oven at ground atmospheric pressure. Internal capacity of the heating furnace is also larger than that of autoclave. The internal pressure method is the best for mass production. In addition, the internal pressure device method can manufacture a double wall tank where the external wall made of FRP protects the internal wall made of FRP. It is difficult to manufacture a double wall tank by autoclave. Further, the internal wall of a double wall tank maintains the high-pressure hydrogen gas, and the external wall protects a high-pressure tank from an external shock loading. Safety increases.

In the internal pressure method, the stiffening pressure is strongly pressurized on to reinforced fiber FRP by both the vapor pressure power inside the tank and the expansion pressure of the heat foam resin. The structural test piece made thus completely cleared 30 tons, which is the maximum value of examination machine at the Yamanashi Prefecture Industrial Technology Center. Its strength corresponds to concrete material.

In an embodiment of the invention, glass fiber may be substituted for carbon fiber. The price of the glass fiber corresponds to about 1/10 of prices of carbon fiber. It is likely to contribute to the reduction in costs of the high-pressure hydrogen tank used for the fuel cell powered vehicle.

An embodiment of an on-board tank for the fuel cell powered vehicle is shown in FIGS. 20A-20D. The basic specs for such an on-board tank are as follows:

1. Hydrogen tank resisting pressure: 750 atmospheric pressures
2. Internal tanks
    (a) Capacity of single tank: 18.5 liters
    (b) Size of single tank: Internal tank diameter φ170 mm, the total length: 870 mm
    (c) Reinforcement thickness of internal tank: 10.0 mm
    (d) External wall reinforcement thickness: 11.4 mm
3. A Set tank
    (a) Number of tank: 5
    (b) Total capacity of set tank: 92 liters
    (c) Size of set tank: 528×716×970 mm
    (d) The total length of set tank (forecast): 1134 mm The high-pressure set tank manufactured according to the invention makes it possible that a lot of cylindrical internal tanks are arranged to be the six-corner honeycomb core assembly. The advantages are as follows:

1. A set tank can be built by one manufacturing process, which arranges a lot of single tanks to the honeycomb core assembly.
    (a) It saves the manufacturing cost.
    (b) The spacing efficiency of the tank arrangement can be improved.
2. The hydrogen tank of the high pressure can be manufactured from the set of the double wall tanks. Therefore, structural strength to an external shock loading is reinforced.
3. In general, a high-pressure tank is destroyed in the longitudinal direction. The bottom in the tank often drops off by the shock loading from the outside. Therefore, a high-pressure tank of the vehicle is put on transverse for the body. The set tank in the concept chart has been designed in the size that can be stored in the reception desk bonnet of the car. Because the set tank assembled with many small diameter tanks does not collapse in the direction of thickness, it is safe for driver.
4. The external shape of the tank set becomes a rectangular hexahedron. Therefore, the method of fixing the hydrogen tank to the floor is easy.

The hydrogen tank unit for transportation is shown in FIGS. 21A-21D. The basic specs for the tank unit are as follows:

1. Internal tank resisting pressure: 750 atmospheric pressures
2. Tank unit set (1 set=1 unit*2)
    (a) Unit capacity: 3000 liters (Set total capacity: 6000 liters)
    (b) Size of unit: 2652×2238×2500 (mm)
    (c) Size of ISO-20F container: 6096×2438×2591 (mm)
    (d) Number of internal tank: 50
    (e) The process of manufacture: As well as the vehicle hydrogen tank The hydrogen tank unit for transportation is designed to be stored in the size of the ISO-20F container. The capacity of the tank unit shown in the concept chart is about 3000 liters. One unit is composed of 50 internal tanks and one set in ISO-20 container is composed of 2 units. The total capacity is 6000 liters. The advantages are as follows:

1. It can be expected that transportation at the room temperature becomes possible because the internal tank unit endures 750 atmospheric pressures.
    (a) The transport efficiency is the same as liquid gasoline because hydrogen gas is liquefied by the high pressure.
    (b) Even if the cooling power supply is lost by any chance, the safety is secured. It saves the cost for safety and maintenance.
2. A tank unit can be built by one manufacturing process, which arranges a lot of single tanks to the honeycomb core assembly.
    (a) The spacing efficiency is improved by increasing the number of the internal tanks.
    (b) It saves the manufacturing cost.
3. The hydrogen tank unit is manufactured from a lot of double wall tanks. Therefore, structural strength to an external shock loading is reinforced.
4. The shape of the tank unit becomes a rectangular hexahedron. Therefore, the method of fixing the hydrogen tank unit to the floor is easy.
5. Safety increases. Because a tank unit of many small tanks can divide the explosion energy to the sum of small energy. And, it is not easy to think about the situation to which all the small diameter tanks explode at the same time, when any trouble occurs.

A transportation lorry for hydrogen tank unit is illustrated in FIGS. 2A-22B. The basic specs are as follows:

1. Lorry transportation
    (a) Lorry transportation: 4 unit
    (b) Lorry capacity: 12,000 liters
    (c) Lorry size: 14,992×2,838×3,481 (mm)
2. Transportation temperature: Room temperature
3. Internal tank resisting pressure: 750 atmospheric pressures The lorry transports two ISO-20F containers (4 hydrogen tank units). The advantages of this configuration are as follows:

1. The transportation efficiency is the same as liquid gasoline because hydrogen gas is liquefied in the high pressure.
2. The transportation cost is saved. The refrigerator for the liquid hydrogen is unnecessary on the lorry. Even if the cooling power supply is lost by any chance, the safety is secured.
3. Structural strength to an external shock loading is reinforced. The hydrogen tank unit is manufactured from a lot of double wall tanks and is protected by the container.

An example of a hydrogen station is shown in FIGS. 23-24. The specification of the hydrogen station are as follows:

1. Size of site: 30×20(m)
2. Hydrogen tank unit: 8 unit (24,000 liters)
3. Special mention: The frozen power supply is unnecessary.

In a preferred embodiment, the hydrogen station is designed to as to be operated at room temperature. The advantages of such an embodiment are as follows:

1. The tank unit of the hydrogen station can secure the structural strength with which the tank unit maintains 750 atmospheric pressures at room temperature.
    (a) The system that cools the hydrogen gas to the liquid hydrogen is not necessary at the hydrogen station.
    (b) When the cooling function is lost by any chance, the hydrogen gas need not be discharged in air. The safety is secured.
2. The capacity of the hydrogen tank unit is 3000 liters per unit.
    (a) When several units of 3000 liters are prepared at the hydrogen station, it has the supply capacity equal to the gas station.
    (b) A large-scale underground tank is unnecessary. It will be possible to construct the hydrogen station cheaply than a present gas station. Moreover, the withdrawal is also easy.
    (c) It is expected that the maintenance cost is the same level as the gas station present.
3. The liquid gasoline delivered by the tank lorry is transported to an underground tank at the gas station. It takes much time. The liquid hydrogen is kept in the storage warehouse on the ground because it is carried with the transportation unit. Much time is not necessary for unloading the transportation unit.
4. It is possible to use the hydrogen unit tank for not only the hydrogen station but also the urgent power supply in public utilities such as the hospitals and subways.

The destiny of the fuel cell powered vehicle is depending on whether it is possible to manage to make equal the equipment cost and the maintenance cost to the same of the gas station. Moreover, the safety is important.

It will be appreciated that modifications may be made in the present invention. For example, the pressure device assembly, which is manufactured from heat foam plastic resin in this invention, can be manufactured from PET bottle or mold plastic. It will not be so difficult to make six-corner PET bottle, five-corner PET bottle and trapezoid-corner PET bottle. At that case, the honeycomb structure manufactured by that way will be a single wall cell structure with lightweight. The honeycomb cell structure of a single wall reinforced by FRP material is lightweight and it will be able to endure considerable weight.

The spirit of this invention is horizontal arrangement of honeycomb core assembly. A honeycomb core assembly is the assembled structure from a lot of individual cells. For that purpose, this invention developed the manufacturing process of honeycomb core assembly of lightweight and high-strength. Accordingly, it should be understood that we intend to cover by the appended claims all modifications falling within the true spirit and scope of our invention.

What is claimed is:

1. A honeycomb storage device for at least one of storing and transporting containers of sensitive or volatile materials, comprising:
   a plurality of six-corner surface tubes arranged in parallel to each other to form a predetermined shape such that the plurality of six-corner surface tubes are longitudinally attached to each other and positioned in a honeycomb structure when viewed in cross-section, wherein
   each of the plurality of six-corner surface tubes includes a hollow internal tank, and is formed from pre-impregnated fibre-reinforced plastic (FRP prepreg) molded into the six-corner surface with a hexagonal shape in cross-section surrounding the hollow internal tank, the hollow internal tank being fixedly positioned inside of a corresponding six-corner surface tube and along a longitudinal axis of the corresponding six-corner surface tube, and the hollow internal tank being formed to contain at least one of sensitive and volatile materials, the FRP prepreg completely filling an internal space of each six-corner surface tube outside of the hollow internal tank.

2. A honeycomb storage device according to claim 1, further comprising:
   a plurality of elongated filler elements, wherein
   each of the plurality of elongated filler elements includes FRP prepreg molded with a four-corner surface longitudinally along each filler element with a trapezoidal shape in cross-section, the FRP prepreg completely filling an internal space of each elongated filler element,
   said plurality of six-corner surface tubes and said plurality of elongated filler elements are arranged into the predetermined shape such that the tubes and filler elements are adjacently attached parallel to each other, and
   said plurality of elongated filler elements are positioned to form at least an outer surface of said predetermined shape such that the plurality of six-corner surface tubes and the plurality of elongated filler elements fixedly contain at least one of sensitive and volatile materials.

3. A honeycomb storage device according to claim 1, wherein both ends of each hollow internal tank in each of the plurality of six-corner surface tubes are sealed.

4. A honeycomb storage device according to claim 1, wherein each hollow internal tank in each of the plurality of six-corner surface tubes is formed from at least one of heatproof plastic and heatproof rubber.

5. A honeycomb storage device according to claim 1, further comprising:
   a plurality of molded five-corner surface tubes, each of the plurality of five-corner surface tubes including a hollow internal tank, and is formed from pre-impregnated fibre-reinforced plastic (FRP prepreg) molded into the five-corner surface with a pentagonal shape in cross-section, surrounding the hollow internal tank, the hollow internal tank being fixedly positioned inside of a corresponding six-corner surface tube and along a longitudinal axis of the corresponding six-corner surface tube, and, the hollow internal tank being formed to contain at least one of sensitive and volatile materials, the FRP prepreg completely filling an internal space of each six-corner surface tube outside of the hollow internal tank, wherein
   said plurality of molded six-corner surface tubes with said plurality of molded five-corner surface tubes are arranged into the predetermined shape such that the tubes are adjacently attached parallel to each other, said plurality of molded five-corner surface tubes being positioned to form at least one of corner portions and end portions of said predetermined shape.

6. A honeycomb storage system for at least one of storing and transporting sensitive or volatile materials, said system comprising:
   a plurality of honeycomb storage devices, each of the honeycomb storage devices including a plurality of six-corner surface tubes arranged in parallel to each other to form a predetermined shape such that the tubes are longitudinally attached to each other and positioned in a honeycomb structure wherein viewed in cross-section, wherein
   each of the plurality of six-corner surface tubes includes a hollow internal tank, and is formed from pre-impregnated fibre-reinforced plastic (FRP prepreg) molded into the six-corner surface with a hexagonal shape in cross-section surrounding the hollow internal tank, the hollow internal tank being fixedly positioned inside of a corresponding six-corner surface tube and along a longitudinal axis of the corresponding six-corner surface tube, and the hollow internal tank being formed to contain at least one of sensitive and volatile materials, the FRP prepreg completely filling an internal space of each six-corner surface tube outside of the hollow internal tank,
   a plurality of elongated filler elements, wherein each of the plurality of elongated filler elements including FRP prepreg molded with a four-corner surface longitudinally along each filler element with a trapezoidal shape in cross-section, the FRP prepreg completely filling an internal space of each elongated filler element,
   said plurality of molded six-corner surface tubes and said plurality of elongated filler elements are arranged into the predetermined shape such that the plurality of molded six-corner surface tubes and filler elements are adjacently attached parallel to each other,
   said plurality of elongated filler elements are positioned to form at least an outer surface of said predetermined shape,
   the plurality of molded six-corner surface tubes and the plurality of elongated filler elements being formed to fixedly contain at least one of sensitive or volatile materials in each of the hollow internal tanks of the plurality of molded six-corner surface tubes, and said plurality of honeycomb storage devices are adjacently attached parallel to each other and positioned in a honeycomb structure when viewed in cross-section.

7. A honeycomb storage system according to claim 6, wherein each of said plurality of honeycomb storage devices further include a plurality of molded five-corner surface tubes, each of the plurality of five-corner surface tubes including a hollow internal tank, and is formed from pre-impregnated fibre-reinforced plastic (FRP prepreg) molded into the five-corner surface with a pentagonal shape in cross-section, surrounding the hollow internal tank, the hollow internal tank being fixedly positioned inside of a corresponding six-corner surface tube and along a longitudinal axis of the corresponding six-corner surface tube, and the hollow internal tank being formed to contain at least one of sensitive and volatile materials, the FRP prepreg completely filling an internal space of each six-corner surface tube outside of the hollow internal tank, wherein said plurality of molded six-corner surface tubes with said plurality of molded five-corner surface tubes are arranged into the predetermined shape such that the plurality of molded six-corner surface tubes are adjacently attached parallel to each other, said plurality of molded five-corner surface tubes being positioned to form at least one of corner portions and end portions in said plurality of honeycomb storage devices.

8. A honeycomb storage system according to claim 6, wherein said plurality of honeycomb storage devices are adjacently attached parallel to each other in groups of five honeycomb storage devices formed together in an outer rectangular box shape.

9. A honeycomb storage system according to claim 6, wherein said plurality of honeycomb storage devices are adjacently attached parallel to each other and formed together in an outer rectangular shipping container shape to be mounted on a lorry.

10. A honeycomb storage system according to claim 6, wherein said plurality of honeycomb storage devices are adjacently attached parallel to each other and formed together in an outer rectangular shipping container shape to be placed in one of a storage facility and distribution facility.

* * * * *